United States Patent
Draese et al.

(10) Patent No.: US 9,009,138 B2
(45) Date of Patent: Apr. 14, 2015

(54) TRANSPARENT ANALYTICAL QUERY ACCELERATOR

(75) Inventors: Oliver Draese, Holzgerlingen (DE); Namik Hrle, Boeblingen (DE); James A. Ruddy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 13/163,309

(22) Filed: Jun. 17, 2011

(65) Prior Publication Data
US 2012/0323884 A1  Dec. 20, 2012

(51) Int. Cl.
G06F 17/30 (2006.01)

(52) U.S. Cl.
CPC .............. *G06F 17/30424* (2013.01)

(58) Field of Classification Search
CPC .......................................... G06F 9/466
USPC .................. 707/607, 713, 719, 600
See application file for complete search history.

(56) References Cited

U.S. PATENT DOCUMENTS

| | | | |
|---|---|---|---|
| 6,957,211 B1 * | 10/2005 | Tyulenev et al. | 707/718 |
| 7,174,342 B1 * | 2/2007 | Scheurich et al. | 1/1 |
| 7,321,907 B2 * | 1/2008 | Tsuchida et al. | 707/607 |
| 7,668,804 B1 * | 2/2010 | El-Helw et al. | 707/719 |
| 7,774,298 B2 * | 8/2010 | Trivedi et al. | 707/600 |
| 7,882,100 B2 * | 2/2011 | Andrei | 707/714 |
| 7,890,496 B2 * | 2/2011 | Li et al. | 707/713 |
| 8,086,598 B1 * | 12/2011 | Lamb et al. | 707/714 |
| 8,386,463 B2 * | 2/2013 | Bestgen et al. | 707/713 |
| 2003/0023607 A1 | 1/2003 | Phelan et al. | |
| 2003/0084053 A1 * | 5/2003 | Govrin et al. | 707/100 |
| 2003/0220860 A1 * | 11/2003 | Heytens et al. | 705/35 |
| 2008/0033914 A1 * | 2/2008 | Cherniack et al. | 707/3 |
| 2008/0281784 A1 * | 11/2008 | Zane et al. | 707/3 |
| 2009/0132471 A1 | 5/2009 | Brown et al. | |
| 2009/0193006 A1 * | 7/2009 | Herrnstadt | 707/5 |
| 2010/0191720 A1 * | 7/2010 | Al-Omari et al. | 707/718 |
| 2011/0208808 A1 * | 8/2011 | Corbett | 709/203 |
| 2012/0072414 A1 * | 3/2012 | He | 707/719 |
| 2012/0166478 A1 * | 6/2012 | Das et al. | 707/769 |

OTHER PUBLICATIONS

Union of Myanmar, IT 05106 Database System Desgin, Implementation and Management, Oct. 24, 2006, pp. 1-14.*
Huamin Chen, et al, A Tiered System for Serving Differentiated Content, Journal World Wide Web, vol. 6 Issue 4, Jun. 27, 2003.

* cited by examiner

*Primary Examiner* — Leslie Wong
(74) *Attorney, Agent, or Firm* — Kunzler Law Group

(57) ABSTRACT

A method and apparatus for transparent analytical query acceleration identifies within a database management system (DBMS) if a query is an analytical type. The query is processed with an analytical query processor if the query is the analytical type. In addition, the query is processed within the DBMS if the query is not the analytical type.

25 Claims, 7 Drawing Sheets

TRANSPARENT ANALYTICAL QUERY ACCELERATOR

FIELD

The subject matter disclosed herein relates to query acceleration and more particularly relates to transparent analytical query acceleration.

BACKGROUND

DESCRIPTION OF THE RELATED ART

Transactional database management systems (DBMS) are typically optimized for more simple queries, particularly queries where the data can be retrieved using an index scan. Analytical DBMS are typically optimized for more complex queries that scan significant amounts of data. Unfortunately, some applications must perform both simple queries and complex queries, and so require an interface to both transactional DBMS and Analytical DBMS.

BRIEF SUMMARY

From the foregoing discussion, it should be apparent that a need exists for a method and apparatus for transparent analytical query acceleration. Beneficially, such a method and apparatus would present a single interface that processes transactional queries and accelerates analytical queries.

The present invention has been developed in response to the present state of the art, and in particular, in response to the problems and needs in the art that have not yet been fully solved by currently available analytical query acceleration methods. Accordingly, the present invention has been developed to provide a method and apparatus for transparent analytical query acceleration that overcome many or all of the above-discussed shortcomings in the art.

A method for transparent analytical query acceleration identifies within a transactional database management system (DBMS) if a query is an analytical type. The method further processes the query with an analytical query processor if the query is the analytical type. In addition, the method processes the query within the DBMS if the query is not the analytical type. An apparatus and computer program product also perform the functions of the method.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
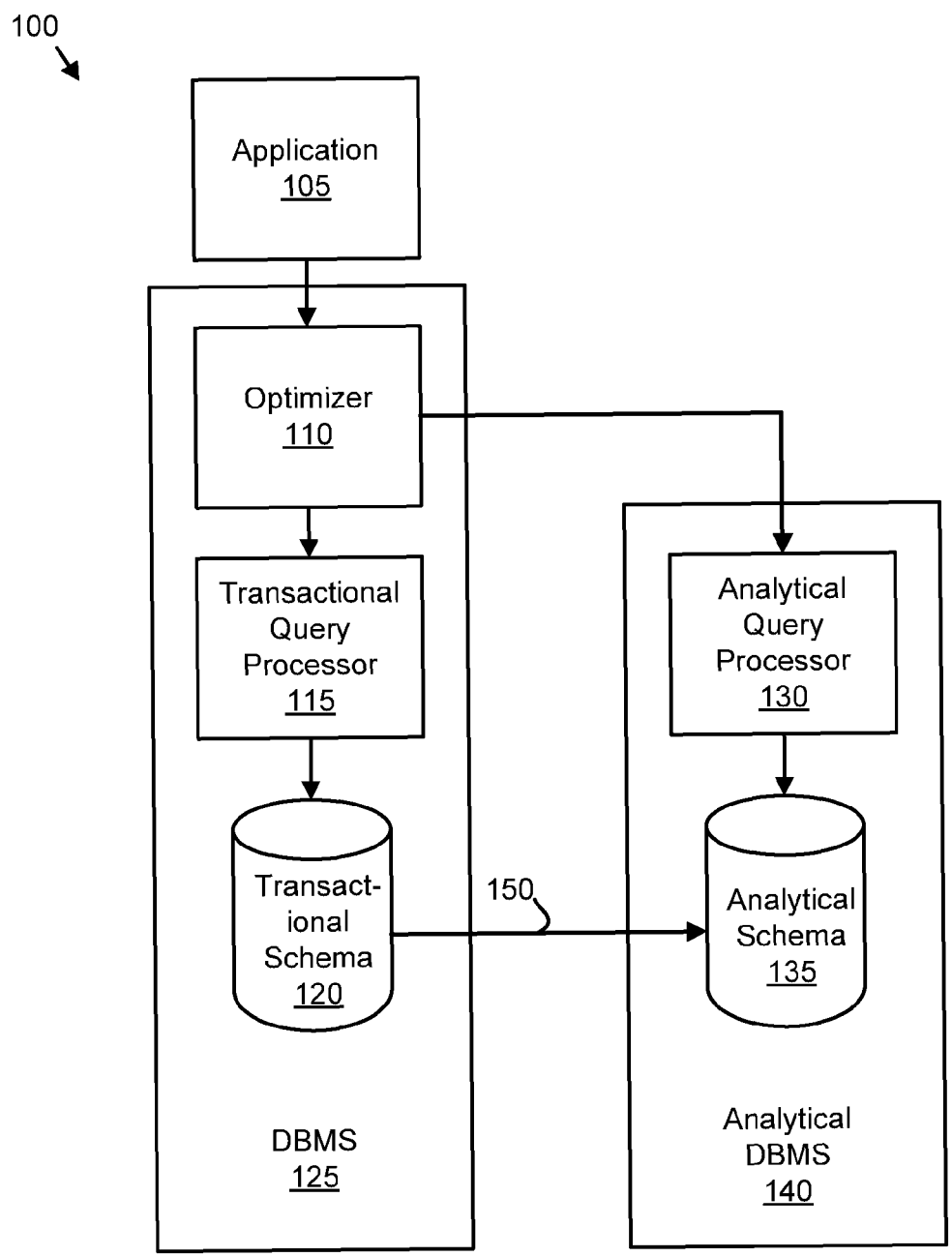
FIG. 1 is a schematic block diagram illustrating one embodiment of a DBMS.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a DBMS 100. The DBMS 100 includes a DBMS 125, an analytical DBMS 140, and an application 105. The application 105 generates queries. Some queries may be best processed as transactional queries. Other queries are best processed as analytical queries. In the past, the application 105 would be responsible for routing a query to an appropriate processor to have either a transactional query or an analytical query processed. The embodiments described hereafter eliminate the need for the application 105 to select a processor by directing all queries from the application 105 to the DBMS 125. The DBMS 125 identifies and transparently accelerates analytical queries, while also processing transactional queries.

The DBMS 125 includes an optimizer 110, a transactional query processor 115, and a transactional schema 120. The transactional schema 120 may be optimized for transactional type queries that access data using an index. In one embodiment, the transactional schema 120 is organized in one or more two-dimensional tables, with data for an account or entry indexed by one or more key values. The transactional query processor 115 may be designed to efficiently execute transactional type queries. The DBMS 125 may be a transactional DBMS. In one embodiment, the DBMS 125 is an On-Line Transaction Processing (OLTP) DBMS.

A transactional type query primarily comprises a short transactions directed to a single table row. Transactions typically include get, insert, update, and delete operations and are targeted to a specified row of a table. For example, a query to update account information using an account number operates efficiently on the data of the transactional schema 120. The transactional query processor 115 may use the account number to locate a row in a database table that comprises the account information and then update an existing value with the new value. The transactional query processor 115 need not sift through large amounts of data because the location of the desire data is already known.

The analytical DBMS 140 includes an analytical query processor 130 and an analytical schema 135. The analytical schema 135 may be optimized for analytical type queries. In one embodiment, the analytical schema 135 comprises data of the transactional schema 120 organized by analytical schema rules. For example, the analytical schema 135 may be organized as one or more multidimensional tables. The analytical DBMS 140 may be an On-Line Analytical Processing DBMS.

An analytical type query may scan and manipulate large amounts of data from multiple tables and multiple table rows to generate a query response. Analytical type queries are more complex than transactional type queries, scanning and aggregating large amounts of data. As result, the analytical schema 135 may be organized very differently from the transactional schema 120.

In one embodiment, the analytical schema 135 is generated 150 from data of the transactional schema 120. A synchronization module that will be described hereafter may generate 150 the analytical schema 135 by copying the data from the transactional schema 120 to the analytical schema 135. However, the data may be organized differently in the analytical schema 135. In addition, the analytical schema 135 may not include all the data of the transactional schema 120. The analytical schema 135 may also include data such as aggregated data values that are not stored in the transactional schema 120.

The DBMS 125 may present a single interface to the application 105 for all queries. Thus the application 105 need only be designed to communicate directly with the DBMS 125 for all queries.

In addition, although the DBMS 125 and the analytical DBMS 140 are separate objects in the depicted embodiment, the DBMS 125 may manage security, integrity, recoverability, availability, and software lifecycle management for both the DBMS 125 and the analytical DBMS 140. This greatly simplifies the overall management of the DBMS 100.

The optimizer 110 is embodied completely within the DBMS 125. In addition, the optimizer 110 is completely integrated with the DBMS 125. Thus queries may be sent to the DBMS 125 without a knowledge of the existence of the optimizer 110 and/or the function of the optimizer 110.

The optimizer 110 receives a query from the application 105. Within the DBMS 125, the optimizer 110 identifies if the query is an analytical type. If the query is an analytical time, the optimizer 110 may route the query to the analytical query processor 130 for processing. The analytical query processor 130 process the query using the analytical schema 135. If the query is a transactional type, the optimizer 110 may route the query to the transactional query processor 115 for processing. The transactional query processor 115 may process the query using the transactional schema 120.

Figure 2:
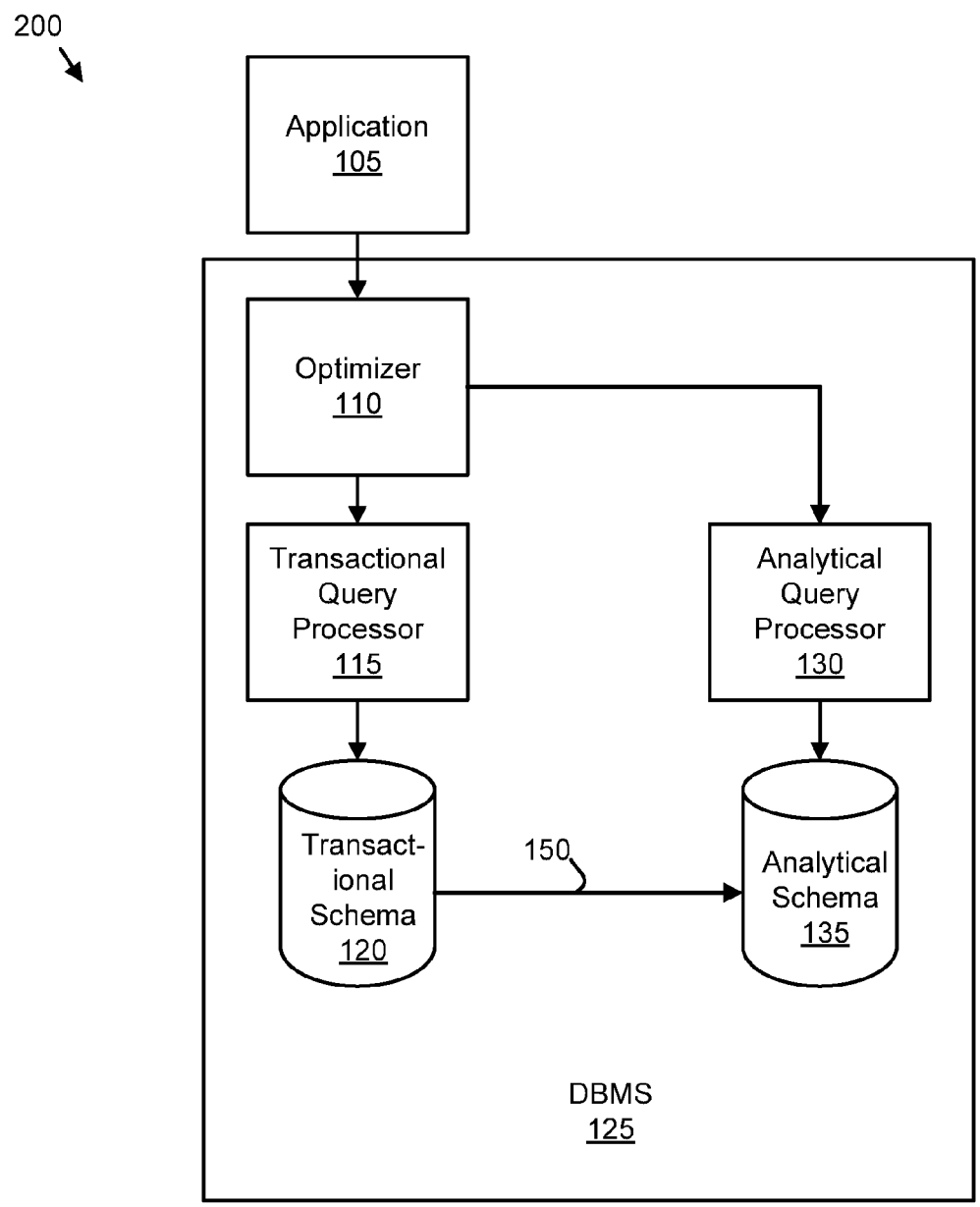
FIG. 2 is a schematic block diagram illustrating one alternate embodiment of a DBMS.

FIG. 2 is a schematic block diagram illustrating one embodiment of a DBMS 200. The DBMS 200 includes a DBMS 125 of FIG. 1. In addition, the DBMS 125 includes the analytical query processor 130 and the analytical schema 135. The description of the DBMS 200 refers to elements of FIG. 1, like numbers referring to like elements.

As with the DBMS 100 of FIG. 1, the DBMS 200 presents a single interface to the application 105 for all queries. In addition, the DBMS 125 manages security, integrity, recoverability, availability, and software lifecycle management for the DBMS 125 as well as for the analytical query processor 130 and the analytical schema 135.

The optimizer 110 is embodied completely within the DBMS 125. In addition, the optimizer 110 is completely integrated with the DBMS 125. Thus queries may be sent to the DBMS 125 without a knowledge of the existence of the optimizer 110 and/or the function of the optimizer 110. The application 105 need only direct a query to the DBMS 125.

The optimizer 110 receives a query from the application 105. Within the DBMS 125, the optimizer 110 identifies if the query is an analytical type. If the query is an analytical type, the optimizer 110 may route the query to the analytical query processor 130 for processing using the analytical schema 135. If the query is a transactional type, the optimizer 110 may route the query to the transactional query processor 115 for processing using the transactional schema 120. In addition, the synchronization module may generate 150 the analytical schema 135 from the data of the transactional schema 120.

Figure 3:
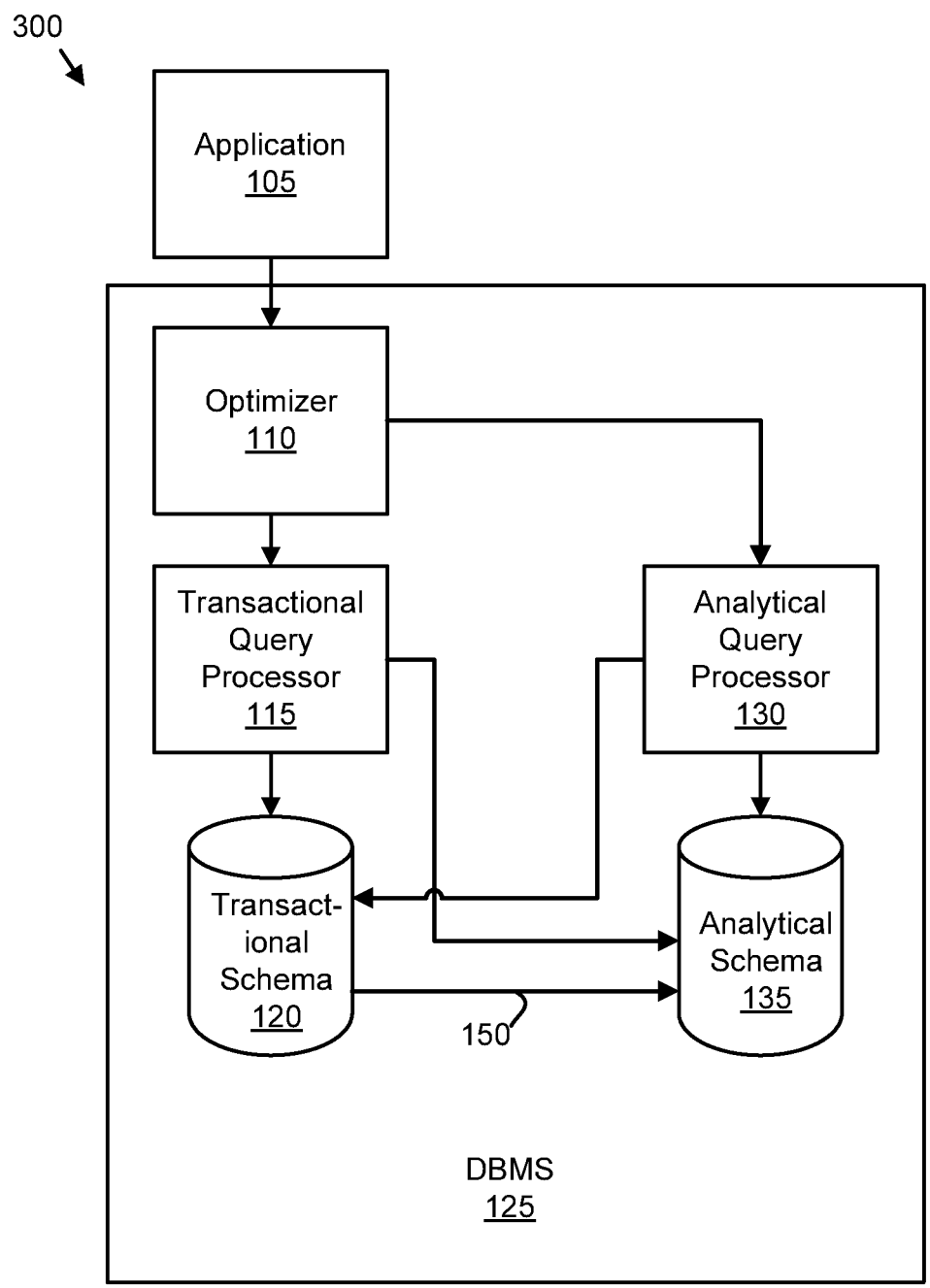
FIG. 3 is a schematic block diagram illustrating one alternate embodiment of a DBMS.

FIG. 3 is a schematic block diagram illustrating one alternate embodiment of a DBMS 300. The DBMS 300 may be the DBMS 200 FIG. 2. In addition, the DBMS 300 supports the analytical query processor 130 processing a query using the transactional schema 120. Further, the DBMS 300 supports the transactional query processor 115 processing a query using the analytical schema 135. The description of the DBMS 300 refers to elements of FIGS. 1-2, like numbers referring to like elements.

As described previously, the optimizer 110 receives a query from the application 105. Within the DBMS 125, the optimizer 110 identifies if the query is an analytical type. If the query is an analytical time, the optimizer 110 may route the query to the analytical query processor 130 for processing. However, the analytical query processor 130 may process the query using the transactional schema 120 and/or the analytical schema 135.

For example, an analytical type query routed to the analytical query processors 130 may require the analysis of data that is present in the transactional schema 120 but that is not present in the analytical schema 135. The analytical query processor 130 may thus process the analytical type query using the transactional schema 120.

If the query is a transactional type, the optimizer 110 may route the query to the transactional query processor 115 for processing. However, the transactional query processor 115 may process the query using the analytical schema 135 and/or the transactional schema 120.

For example, a transactional type query routed to the transactional query processor 115 may require aggregations of data that reside in the analytical schema 135, but that do not reside in the transactional schema 120. The transactional query processor 115 may process the transactional type query by using the analytical schema 135.

Figure 4:
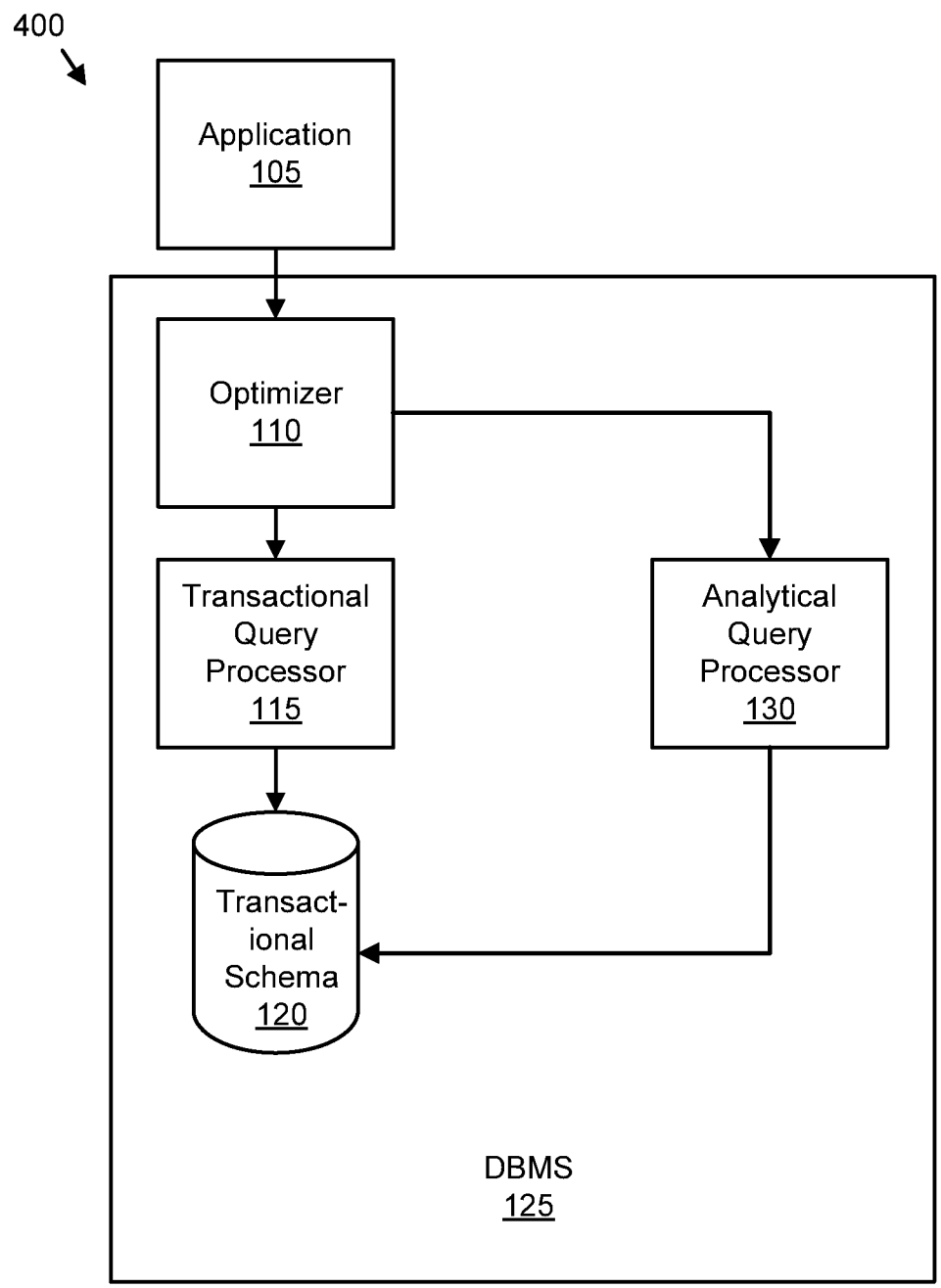
FIG. 4 is a schematic block diagram illustrating one alternate embodiment of a DBMS.

FIG. 4 is a schematic block diagram illustrating one alternate embodiment of a DBMS 400. The DBMS 400 is the DBMS 200, 300 of FIGS. 2 and 3 without the analytical schema 135. The description of the DBMS 400 refers to elements of FIGS. 1-3, like numbers referring to like elements.

The optimizer 110 receives a query from the application 105. Within the DBMS 125, the optimizer 110 identifies if the query is an analytical type. If the query is an analytical type, the optimizer 110 may route the query to the analytical query processor 130 for processing. However, the analytical query processor 130 always processes the analytical type query using the transactional schema 120. If the query is a transactional type, the optimizer 110 may route the query to the transactional query processor 115 for processing using the transactional schema 120.

Figure 5:
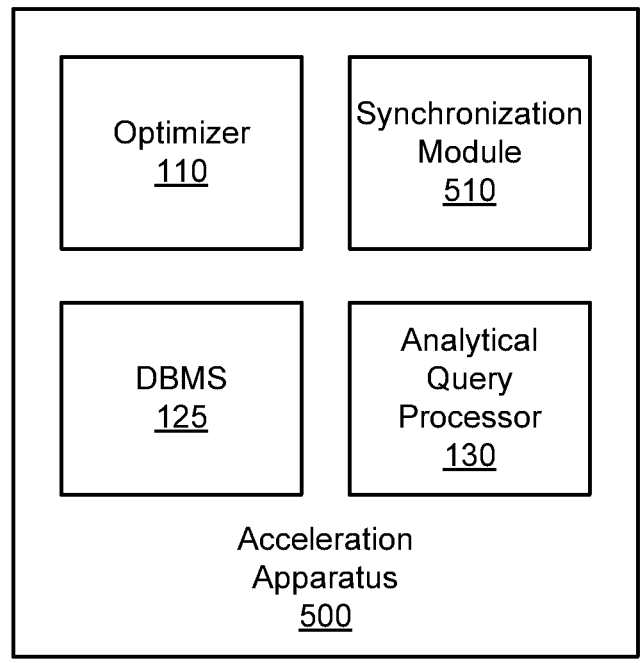
FIG. 5 is a schematic block diagram illustrating one embodiment of an acceleration apparatus.

FIG. 5 is a schematic block diagram illustrating one embodiment of an acceleration apparatus 500. The apparatus 500 may transparently accelerate analytical queries for the DBMS 100, 200, 300, 400 of FIGS. 1-4. The description of the apparatus 500 refers to elements of FIGS. 1-4, like numbers referring to like elements.

The optimizer 110, synchronization module 510, DBMS 125, and analytical query processor 130 may be embodied in a computer readable storage medium storing computer readable program code executable by a processor. The optimizer 110 is embodied within an integrated with the DBMS 125. The optimizer 110 receives queries directed to the DBMS 125. The optimizer 110 identifies if the query is the analytical type.

The synchronization module 510 may generate 150 the analytical schema 135 from the data of the transactional schema 120. In one embodiment, the synchronization module 510 includes a mapping of the tables, rows, and columns of the transactional schema 120 to the analytical schema 135. In one embodiment, the synchronization module 510 copies data from the transactional schema 120 to the analytical query processor 130 after a specified time interval has elapsed. In addition, the synchronization module 510 may process the data by aggregating selected data values.

Figure 6:
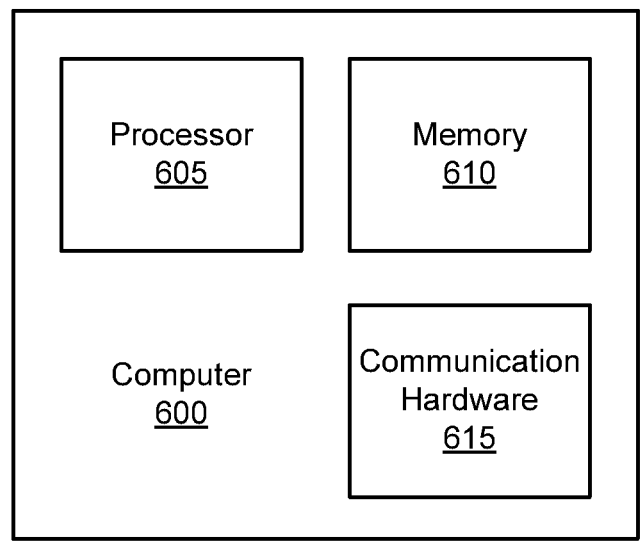
FIG. 6 is a schematic block diagram illustrating one embodiment of a computer.

FIG. 6 is a schematic block diagram illustrating one embodiment of the computer 600. The computer 600 includes a processor 605, a memory 610, and communication hardware 615. The memory 610 may be a computer readable storage medium such as a hard disk drive, a semiconductor storage device, a micromechanical storage device, and optical storage device, a holographic storage device, and the like. The memory 610 may store computer readable program code. The processor 605 may execute the computer readable program code. The communication hardware 615 may communicate with devices outside of the computer 600. In one embodiment, the acceleration apparatus 500 of FIG. 5 is embodied within the computer 600.

Figure 7:
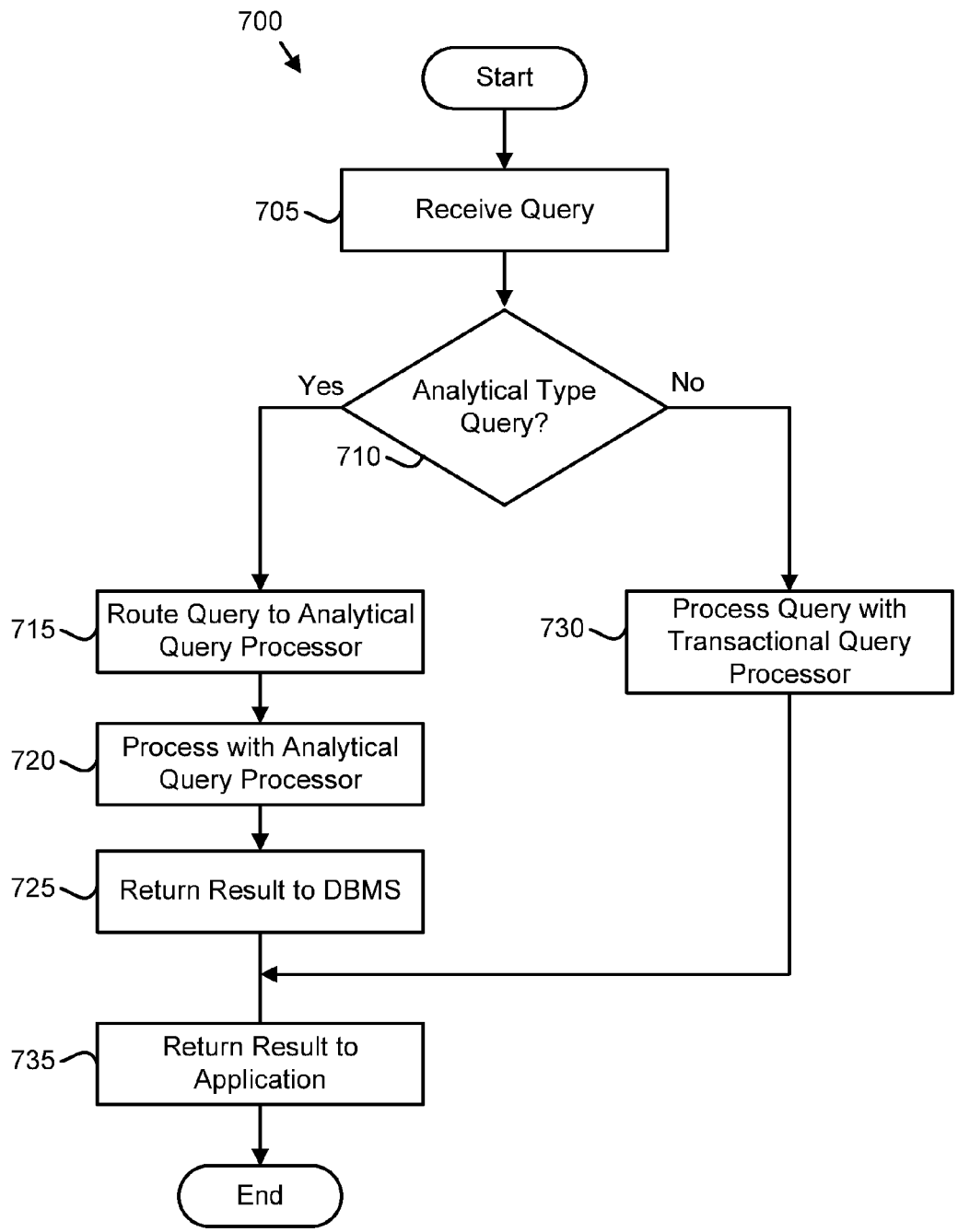
FIG. 7 is a schematic flow chart diagram illustrating one embodiment of a transparent analytical query acceleration method.

FIG. 7 is a schematic flow chart diagram illustrating one embodiment of a transparent analytical query acceleration method 700. The method 700 may perform the functions of the DBMS 100, 200, 300, 400 and apparatus 500 of FIGS. 1-5. The description of the method 700 refers to elements of FIGS. 1-5, like numbers referring to like elements.

The method 700 may be performed by a computer program product. The computer program product may comprise a computer readable storage medium storing computer readable program code. Alternatively, the method 700 may be full performed by the processor 605.

The method 700 starts, and in one embodiment, the DBMS 125 receives 705 a query from the application 105. In one embodiment, the application 105 directs all queries to a single interface of the DBMS 125.

The optimizer 110 determines 710 if the query is an analytical type query. If the optimizer 110 determines 710 the query is not an analytical type query, the transactional query processor 115 processes 730 the query.

In one embodiment, the optimizer 110 determines 710 the query is the analytical type if the Equation 1 is true, where each k is a constant greater than zero, $c_a$ is a cost of analytical processing, $c_t$ is a cost of transactional processing, s equals 1 if the query does not comprise an index scan, w is a number of where predicates in the query, g is a number of groups in the query, and T is an analytical threshold.

$$k_1(c_a-c_t)+k_2s+k_3w+k_4g>T \quad \text{Equation 1}$$

One of skill in the art will recognize that the optimizer 110 may employ other tests to determine 710 if the query is the analytical type. If the optimizer 110 determines 710 at the query is an analytical type query, the optimizer 110 may route 715 the query to the analytical query processor 130. In one embodiment, the optimizer 110 routes 715 the query to the analytical query processor 130 of the separate analytical DBMS 140. Alternatively, the optimizer 110 routes 715 the query to the analytical query processor 130 integrated within the DBMS 125.

The analytical query processor 130 may process 720 the query. In one embodiment, the analytical query processor 130 processes 720 the query using the analytical schema 135. Alternatively, the analytical query processor 130 may process 720 the query using the transactional schema 120. In a certain embodiment, the analytical query processor 130 processes 720 the query using both the analytical schema 135 and the transactional schema 120.

In one embodiment, the analytical query processor 130 returns a result of the query to the DBMS 125. The DBMS 125 may return 735 the query to the application 105 and the method 700 ends. The method 700 supports sending both transactional type queries and analytical type queries to a single interface of the DBMS 125. Thus an application 105 need not determine the type of a query or whether the transactional query processor 115 or the analytical query processor 130 is best suited to process the query. Instead, the determination of the type of the query and the routing of the query to either the transactional query processor 115 to the analytical query processor 130 is entirely integrated within the DBMS 125.

Figure 8:
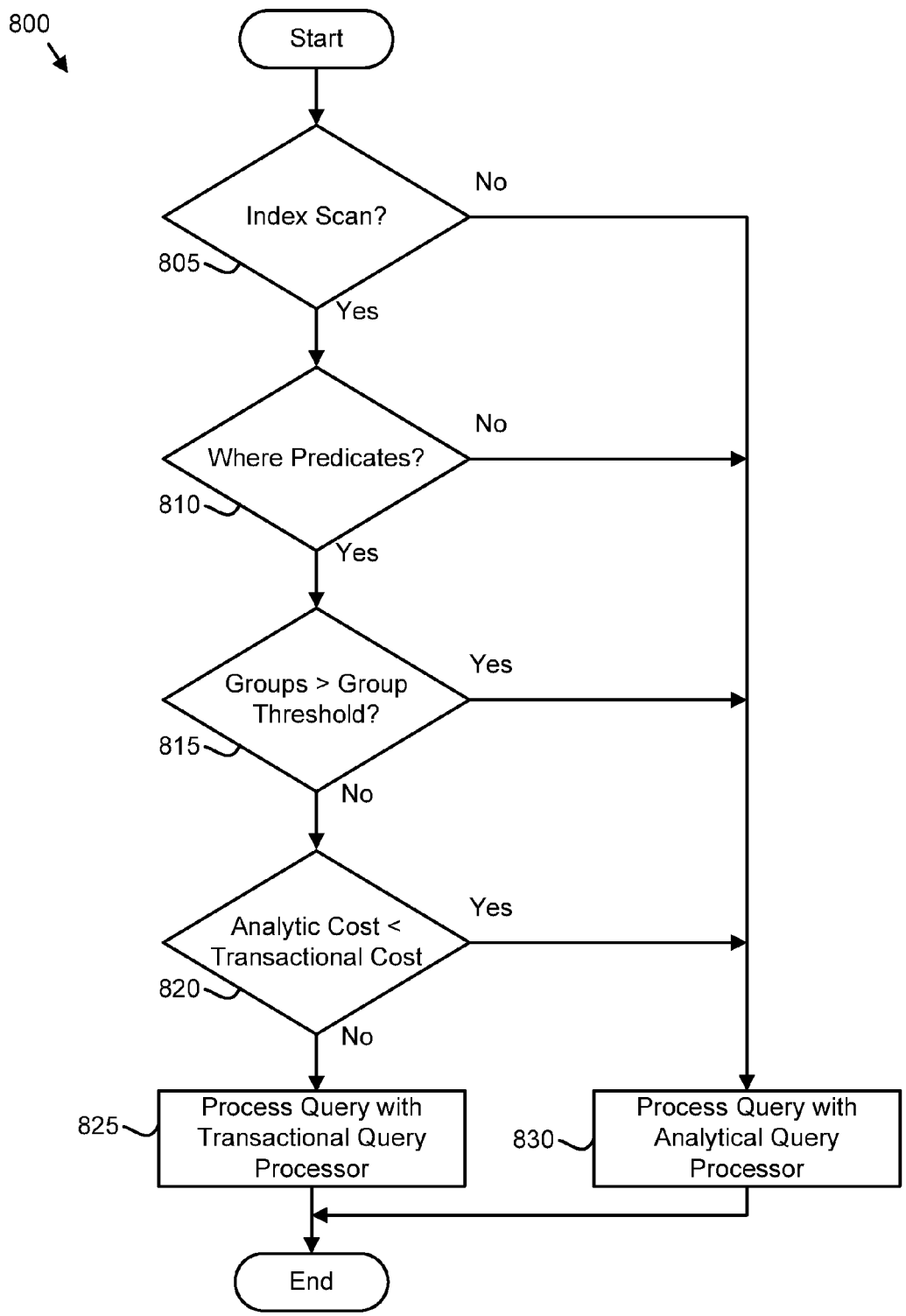
FIG. 8 is a schematic flow chart diagram illustrating one embodiment of a query type identification method.

FIG. 8 is a schematic flow chart diagram illustrating one embodiment of a query identification method 800. The method 800 may embody steps 710, 720, and 730 of the method 700 of FIG. 7. The description of the method 800 refers to elements of FIGS. 1-7, like numbers referring to like elements.

The method 800 may be performed by a computer program product. The computer program product may comprise a computer readable storage medium storing computer readable program code. Alternatively, the method 800 may be full performed by the processor 605.

The method 800 starts, and in one embodiment the optimizer 110 determines 805 if the query comprises an index scan. The query may be identified as not the analytical type if the query is comprises an index scan. If the query does not include the index scan, the query may be processed 830 with the analytical query processor 130.

If the optimizer 110 determines 805 that the query includes an index scan, the optimizer may further determine 810 if the query comprises where predicates. For example, the Structured Query Language (SQL) statement "DELETE FROM TABLE1 WHERE COL1 IS NULL" includes the where predicate "WHERE COL1 IS NULL" indicating that the delete will only occur if COL1 is null. If the query does not include a where predicate, the query may be processed 830 with the analytical query processor 130.

If the optimizer 110 determines 810 that the query includes where predicates, the optimizer may determine 815 if the number of groups in the query exceeds a group threshold. A group may be formed by an SQL "GROUP BY" clause. If the group threshold is two, the optimizer 110 may determine 815 that the number of groups exceeds the group threshold if there are three or more "GROUP BY" clauses in the query. If the number of groups in the query exceeds the group threshold, the query may be processed 830 with the analytical query processor 130.

If the optimizer 110 determines 815 that the number of groups in the query does not exceed the group threshold, the optimizer 110 may determine 820 if a cost of analytical processing with the analytical query processor 130 is less than cost a transactional processing with the transactional query processor 115. In one embodiment, the determination 820 is based on a heuristic comprising a comparison of a cost of processing the query with the analytical query processor 130 and a cost of processing the query with the transactional query processor 115.

If the optimizer 110 determines 820 that the cost of analytical processing is less than the cost of transactional processing, the query may be processed 830 with the analytical query processor 130 and the method 800 ends. If the optimizer 110 determines 820 to the cost of analytical processing is not less than the cost of transactional processing, the query may be processed 825 with the transactional query processor 115 and the method 800 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for transparent analytical query acceleration comprising:
identifying, by use of a processor, within a database management system (DBMS) a query as an analytical type in response to a predefined query element, wherein the predefined query element is one of the query not including an index scan and the query not including a where predicate, and a processing cost of processing the query with an analytical query processor being less than a processing cost of processing the query with a transactional query processor of a general purpose computer within the DBMS;
processing the query with the analytical query processor if the query is the analytical type; and
processing the query with the transactional query processor within the DBMS if the query is not the analytical type.

2. The method of claim 1, wherein the DBMS presents a single interface to an application for all queries.

3. The method of claim 1, wherein the DBMS manages security, integrity, recoverability, availability, and software lifecycle management for the DBMS, the analytical query processor, and an analytical schema.

4. The method of claim 1, wherein the transactional query processor processes the query on a transactional schema and the analytical query processor processes the query on an analytical schema.

5. The method of claim 4, wherein the analytical schema comprises data of the transactional schema organized by analytical schema rules.

6. The method of claim 1, wherein the identification is based on a heuristic comprising a comparison of the processing cost of processing the query with the analytical query processor and the processing cost of processing the query with the transactional query processor.

7. The method of claim 1, wherein the query is identified as the analytical type if $k_1(c_a-c_t)+k_2s+k_3w+k_4g>T$ is true, where each k is a constant greater than zero, $c_a$ is a cost of analytical processing, $c_t$, is a cost of transactional processing, s equals 1 if the query does not comprise an index scan, w is a number of where predicates in the query, g is a number of groups in the query, and T is an analytical threshold.

8. An apparatus comprising:
a computer readable storage medium storing computer readable program code executable by a processor, the computer readable program code comprising:
an optimizer identifying within a transactional database management system (DBMS) a query as an analytical type in response to a predefined query element, wherein the predefined query element is one of the query not including an index scan and the query not including a where predicate, and a processing cost of processing the query with an analytical query processor being less than a processing cost of processing the query with a transactional query processor of a general purpose computer within the DBMS;
the analytical query processor processing the query if the query is the analytical type; and
the transactional query processor processing the query within the DBMS if the query is not the analytical type.

9. The apparatus of claim 8, wherein the DBMS presents a single interface to an application for all queries.

10. The apparatus of claim 8, wherein the DBMS manages security, integrity, recoverability, availability and software lifecycle management for the DBMS, the analytical query processor, and an analytical schema.

11. The apparatus of claim 8, wherein the transactional query processor processes the query on a transactional schema and the analytical query processor processes the query on an analytical schema.

12. The apparatus of claim 11, wherein the analytical schema comprises data of the transactional schema organized by analytical schema rules and wherein the query is identified as the analytical type if $k_1(c_a-c_t)+k_2s+k_3w+k_4g>T$ is true, where each k is a constant greater then zero, $c_a$ is a cost of analytical processing, $c_1$ is a cost of transactional processing, s equals 1 if the query does not comprise an index scan, w is a number of where predicates in the query, g is a number of groups in the query, and T is an analytical threshold.

13. The apparatus of claim 8, wherein the identification is based on a heuristic comprising a comparison of the processing cost of processing the query with the analytical query processor and the processing cost of processing the query with the transactional query processor.

14. A computer program product for transparent analytical query acceleration, the computer program product comprising:
a computer readable storage medium having computer readable program code embodied therein, the computer readable program code configured to:
identify within a transactional database management system (DBMS) a query as an analytical type in response to a predefined query element, wherein the predefined query element is one of the query not including an index scan and the query not including a where predicate, and a processing cost of processing the query with an analytical query processor being less than a processing cost of processing the query with a transactional query processor of a general purpose computer within the DBMS;
process the query with the analytical query processor if the query is the analytical type; and
process the query with the transactional query processor within the DBMS if the query is not the analytical type.

15. The computer program product of claim 14, wherein the DBMS presents a single interface to an application for all queries.

16. The computer program product of claim 14, wherein the DBMS manages security, integrity, recoverability, availability and software lifecycle management for the DBMS, the analytical query processor, and an analytical schema.

17. The computer program product of claim 14, wherein the transactional query processor processes the query on a transactional schema and the analytical query processor processes the query on an analytical schema.

18. The computer program product of claim 17, wherein the analytical schema comprises data of the transactional schema organized by analytical schema rules.

19. The computer program product of claim 14, wherein the query is identified as $k_1(c_a-c_t)+k_2s+k_3w+k_4g>T$ is true, where each k is a constant greater than zero, $c_a$ is a cost of analytical processing, $c_t$ is a cost of transactional processing, s equals 1 if the query does not comprise an index scan, w is a number of where predicates in the query, g is a number of groups in the query, and T is an analytical threshold.

20. A method for integrating a computer program product, comprising integrating computer readable program code into a computing system, wherein the code in combination with the computing system performs the following:
identifying within a transactional database management system (DBMS) a query as an analytical type in response to a predefined query element, wherein the predefined query element is one of the query not including an index scan and the query not including a where predicate, and a processing cost of processing the query with an analytical query processor being less than a processing cost of processing the query with a transactional query processor of a general purpose computer within the DBMS;

processing the query with the analytical query processor if the query is the analytical type; and processing the query with the transactional query processor within the DBMS if the query is not the analytical type.

21. The method of claim 20, wherein the DBMS presents a single interface to an application for all queries.

22. The method of claim 20, wherein the DBMS manages security, integrity, recoverability, availability and software lifecycle management for the DBMS, the analytical query processor, and an analytical schema.

23. The method of claim 20, wherein the transactional query processor processes the query on a transactional schema and the analytical query processor processes the query on an analytical schema.

24. The method of claim 23, wherein the analytical schema comprises data of the transactional schema organized by analytical schema rules and wherein the query is identified as the analytical type if $k_1(c_a-c_t)+k_2s+k_3w+k_4g>T$ is true, where each k is a constant greater than zero, $c_a$ is a cost of analytical processing, $c_t$ is a cost of transactional processing, s equals 1 if the query does not comprise an index scan, w is a number of where predicates in the query, g is a number of groups in the query, and T is an analytical threshold.

25. The method of claim 20, wherein the identification is based on a heuristic comprising a comparison of the processing cost of processing the query with the analytical query processor and the processing cost of processing the query with the transactional query processor.

* * * * *